United States Patent
Melzer et al.

(10) Patent No.: US 11,754,667 B2
(45) Date of Patent: *Sep. 12, 2023

(54) SYSTEM AND METHOD FOR DETERMINING INTERFERENCE IN A RADAR SYSTEM

(71) Applicant: Infineon Technologies AG, Neubiberg (DE)

(72) Inventors: Alexander Melzer, Neutillmitsch (AT); Paul Meissner, Feldkirchen bei Graz (AT); Mate Andras Toth, Graz (AT)

(73) Assignee: Infineon Technologies AG, Neubiberg (DE)

(*) Notice: Subject to any disclaimer, the term of this patent is extended or adjusted under 35 U.S.C. 154(b) by 8 days.

This patent is subject to a terminal disclaimer.

(21) Appl. No.: 17/450,346

(22) Filed: Oct. 8, 2021

(65) Prior Publication Data

US 2022/0026521 A1 Jan. 27, 2022

Related U.S. Application Data

(63) Continuation of application No. 16/134,814, filed on Sep. 18, 2018, now Pat. No. 11,175,376.

(51) Int. Cl.
*G01S 7/02* (2006.01)
*G01S 7/35* (2006.01)

(52) U.S. Cl.
CPC ............ *G01S 7/023* (2013.01); *G01S 7/0232* (2021.05); *G01S 7/352* (2013.01)

(58) Field of Classification Search
None
See application file for complete search history.

(56) References Cited

U.S. PATENT DOCUMENTS

| | | |
|---|---|---|
| 2008/0106460 A1 | 5/2008 | Kurtz et al. |
| 2016/0291130 A1 | 10/2016 | Ginsburg et al. |
| 2019/0056476 A1 | 2/2019 | Lin |

*Primary Examiner* — Whitney Moore
(74) *Attorney, Agent, or Firm* — Slater Matsil, LLP

(57) ABSTRACT

In accordance with an embodiment, a method of operating a radar system includes activating a transmitter to transmit a radar signal during a first time period, receiving a reflection of the radar signal from a radar antenna, downconverting the reflected radar signal, and digitally processing the downconverted reflected radar signal within a first frequency bandwidth using a first signal path. The method also includes deactivating the transmitter during a second time period, receiving a second signal from the radar antenna during the second time period, downconverting the second signal, measuring a power of the downconverted second signal within a second frequency bandwidth using a second signal path different from the first signal path, and determining an interference metric based on measuring the power.

20 Claims, 10 Drawing Sheets

SYSTEM AND METHOD FOR DETERMINING INTERFERENCE IN A RADAR SYSTEM

This application is a continuation of U.S. patent application Ser. No. 16/134,814, filed on Sep. 18, 2018, now U.S. Pat. No. 11,175,376, which application is hereby incorporated herein by reference in its entirety.

TECHNICAL FIELD

The present invention relates generally to a system and method of determining interference in a radar system.

BACKGROUND

Frequency modulated continuous wave (FMCW) radar systems are increasingly being used in cars to enable advanced driver assistance systems (ADAS) as well as autonomous driving features. With more and more cars being equipped with radar sensors, interference between the radar sensors is expected to become a predominant issue in the near future.

More specifically, when a number of automotive radar devices in a particular vicinity electromagnetic waves in the same frequency range, potential interference between the automotive radar devices may occur. In addition to receiving an expected reflected radar signal at a particular frequency, a radar sensor of one of the automotive radar device may also receive an interfering transmitted or reflected signal generated by a radar sensor of another automotive radar device in the near vicinity. These interfering radar signals may increase the noise floor of the radar sensor's receiver and make objects difficult or impossible to detect depending on the amount of interference. Under certain circumstances, such interference may also lead to ghost targets.

SUMMARY

In accordance with an embodiment, a method of operating a radar system includes activating a transmitter to transmit a radar signal during a first time period, receiving a reflection of the radar signal from a radar antenna, downconverting the reflected radar signal, and digitally processing the downconverted reflected radar signal within a first frequency bandwidth using a first signal path. The method also includes deactivating the transmitter during a second time period, receiving a second signal from the radar antenna during the second time period, downconverting the second signal, measuring a power of the downconverted second signal within a second frequency bandwidth using a second signal path different from the first signal path, and determining an interference metric based on measuring the power.

In accordance with another embodiment, a method includes activating a transmitter to transmit a radar signal during a first time period; receiving a reflection of the radar signal from a radar antenna; downconverting the reflected radar signal to obtain a downconverted analog signal; analog-to-digital converting the downconverted analog signal to form a digitized signal; digitally processing the digitized signal a first signal path; filtering the downconverted analog signal to form a filtered signal; measuring a power of the filtered signal using a second signal path different from the first signal path; and determining an interference metric based on measuring the power.

In accordance with a further embodiment, a radar system includes a downconverter having a first input configured to be coupled to a radar antenna and a second input configured to receive a local oscillator (LO) signal; a first receive path coupled to the downconverter, the first receive path configured to digitally process a first signal from the downconverter; a second signal path coupled to the downconverter, wherein the second signal path is configured to receive a second signal from the downconverter and measure a power of the second signal within a bandwidth, and the second signal path is different from the first receive path; and a controller configured to determine an interference metric based on the power measured by the second signal path.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

Figure 1A:
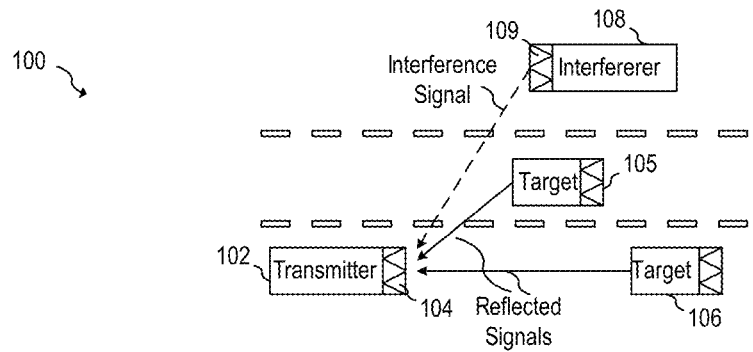
FIG. 1A illustrates a diagram an example automotive radar scenario.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for determining interference in a radar system. The invention may also be applied to the detection of interference in other types of RF systems.

In various embodiments, a radar system includes a first signal path configured to receive and process reflected radar signals, as well as a second signal path that is used to determine the presence of interfering signals. In one example, the first signal path includes an analog front-end, an analog-to-digital converter, and a digital processing circuit that is used to determine the received radar signal according to radar signal processing principles known in the art. The second signal path has a much larger bandwidth than the first signal path and may include an analog power detector configured to detect the power present in a relatively large bandwidth. Because of the large bandwidth of the second signal path, a very large frequency range can be quickly scanned to determine the presence of interference over a large number of channels.

Interference may be detected by turning off the radar's transmitter, sweeping the radar receiver's LO frequency, and detecting the received power over the swept LO frequency. The LO frequency may be swept, for example, in a step-wise or in a continuous manner. Based on the frequencies at which power is detected, the radar system can determine which frequency ranges contain interference and which frequency ranges are suitable for low-interference operation of the radar system. In some embodiments, the radar system is configured to determine an operational frequency range based on the power measurements.

In some embodiments, the radar system may also be configured to detect the presence of interferers when the radar transmitter is active. In such embodiments, the second signal path includes a plurality of bandpass filters configured to monitor received frequencies that lie just outside of the receive bandwidth of the first signal path. Embodiment radar systems may also be configured to predict the trajectory of interfering signals based on the timing and frequency ranges of detected interference signals.

Advantages of embodiment radar systems include the ability to quickly detect the presence of interfering signals, and quickly select a new operating frequency based on the characteristics of the detected interference signals in a power efficient manner. By avoiding interference with a relatively fast reaction time, high radar system performance can be maintained for longer periods of time. In systems such as automotive radar and collision avoidance systems, high radar system performance leads to safer operation.

FIG. 1A illustrates an example automotive radar scenario 100 that represents radar sensor equipped four cars 102, 105, 106 and 108 driving on a small section of highway. Automotive radar system 104 installed on car 102 transmits and receives, for example, a frequency modulated continuous wave (FMCW) signal, and detects reflections of this transmitted signal in order to determine a distance between automotive radar system 104 and other vehicles or objects on the road, such as cars 105, 106 and 108. However, in situations where other cars on the highway also utilize automotive radar systems, such as automotive radar system 109 installed in car 108, there is a risk of reduced radar performance due to interfering signals transmitted by other automotive radar systems. In the illustrated example, the radar signal transmitted by radar system 109 of car 108 is received by radar system 104 along with the reflections from cars 105 and 106. These directly received transmitted signals are especially problematic because they often contain much more power than the received reflected signals.

Figure 1B:
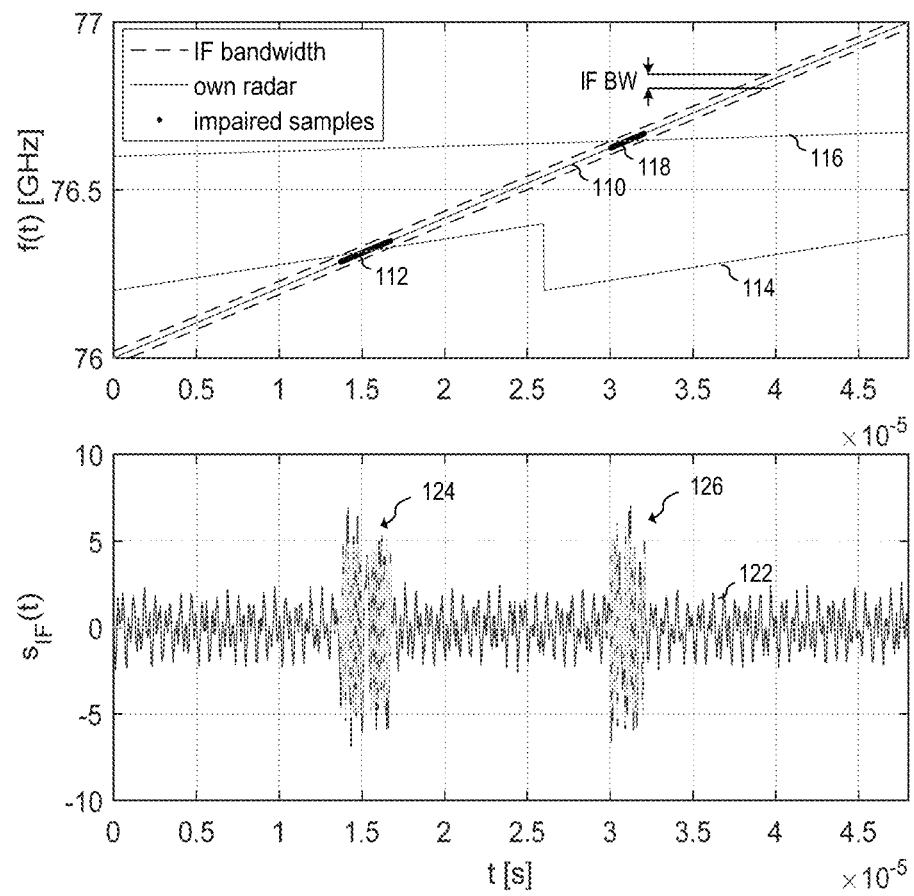
FIGS. 1B and 1C illustrates a graphs of radar frequencies verses time corresponding to the example automotive radar scenario of FIG. 1A.

FIG. 1B illustrates a graph of radar frequencies with respect to time for three FMCW radar systems that are located in the same vicinity, and a graph of received interference power $S_{IF}(t)$ versus time. Trace no represents the LO frequency of a reference radar system, and the dashed lines that surround trace no represent the intermediate frequency (IF) bandwidth of the radar receiver of the reference radar system. Traces 114 and 116 represent the frequency of received interference signals from a first and second neighboring radar system. During operation, the LO frequency of the reference radar system linearly increases from 76 GHz to 77 GHz. When the frequency of the received interference signal 114 from the first neighboring radar system falls within the IF bandwidth of the radar receiver of the reference radar system, interference 112 results. Similarly, when the frequency of the received interference signal 116 from the second neighboring radar system falls within the IF bandwidth of the radar receiver of the reference radar system, interference 118 results. These regions of interference 112 and 118 produce chirp-like signals when received by the reference radar system, which essentially increases the noise floor of the receiver. The effect of the increase in noise floor is illustrated in the graph of received IF signal $S_{IF}(t)$ versus time, which is represented by trace 122. As shown, increased interference region 124 corresponds to the time period in which the frequency of the received interference signal 114 from the first neighboring radar system falls within the IF bandwidth of the radar receiver of the reference radar system, and increased interference region 126 corresponds to the time period in which the frequency of the received interference signal 116 from the first neighboring radar system falls within the IF bandwidth of the radar receiver of the reference radar system. Thus, the detection sensitivity of the reference radar system is degraded due to the effective reduction in signal-to-noise ratio (SNR).

Figure 1C:
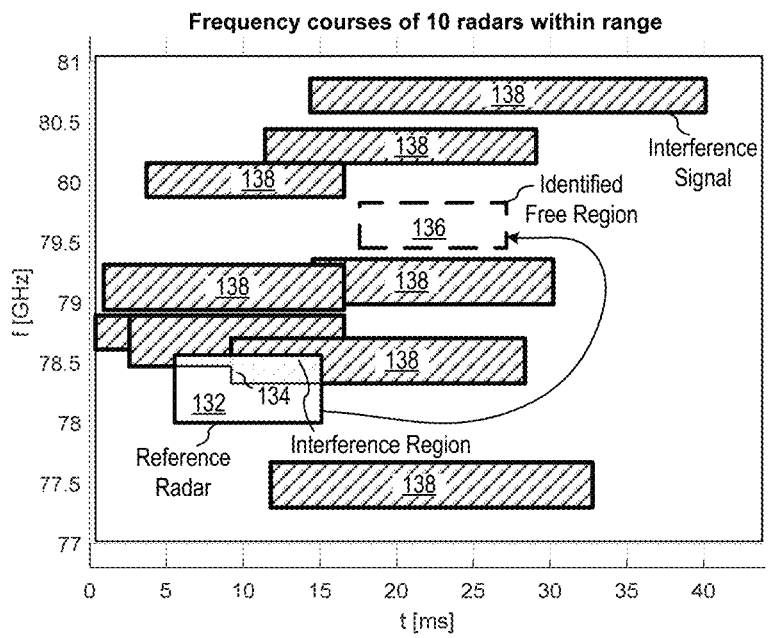

FIG. 1C illustrates a graph of operation frequency ranges versus time for a number of different radar system located within the same vicinity. Reference operation frequency range 132 represents the frequency of operation of the reference radar system during the time period from 5 ms to 15 ms. Interfering frequency ranges 138 represent interfering transmissions produced by other radar and RF system that are receivable by the reference radar system. As shown, portion 134 of reference operation frequency range 132 overlaps with portions of interfering frequency ranges 138. These overlapping portions represent operation regions where radar performance may be reduced.

In embodiments of the present invention, the reference radar system is configured to detect the presence of interfering frequency ranges 138 and identify potentially available frequency ranges (such as frequency range 136) having reduced interference based on interference metrics such as measured interference, whether the measured interference exceeds a predetermined threshold, the frequency trajectory of the measured interference, the time intervals in which the measured interference is observed and other interference metrics. Once a potentially available frequency range (such as frequency range 136) has been identified, the reference radar system may change its future transmission frequency to operate within the potentially available frequency range.

Figure 2:
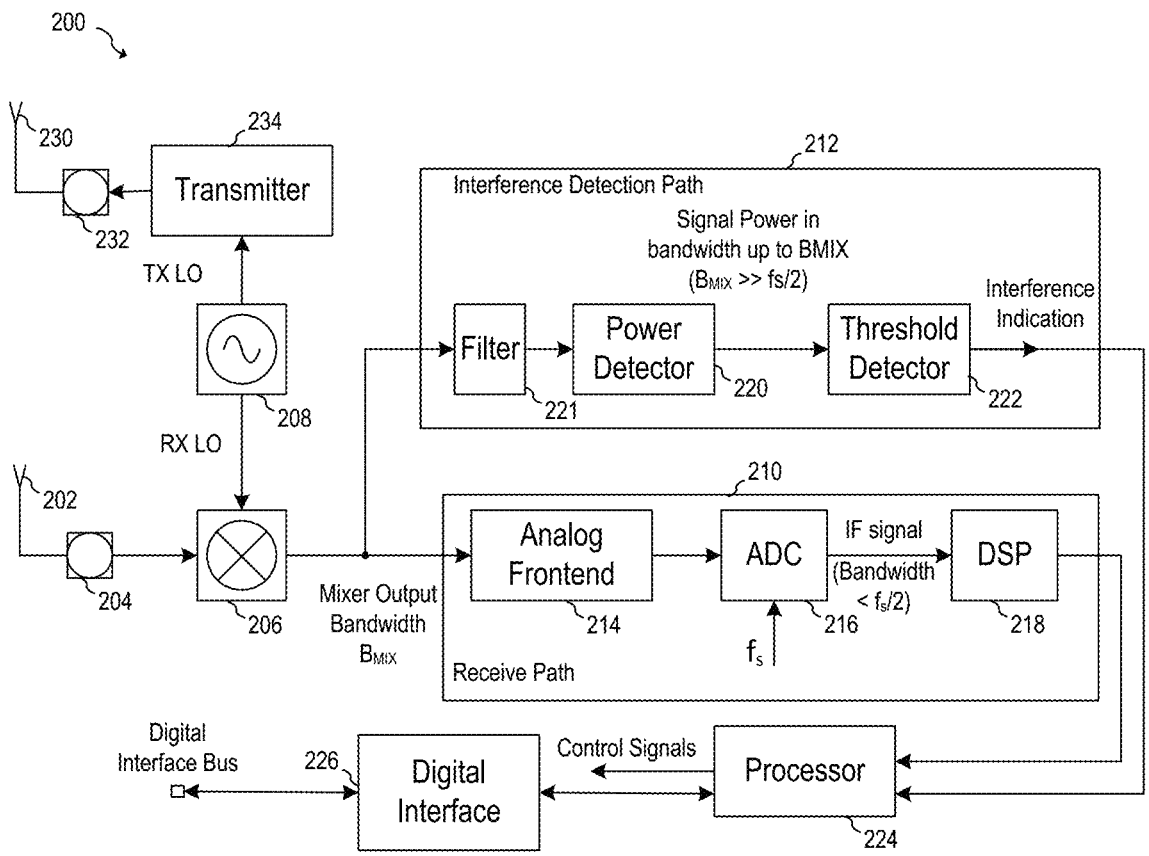
FIG. 2 illustrates a block diagram of an embodiment radar system.

FIG. 2 illustrates an embodiment radar system 200 that is configured to determine frequencies at which interference is present. As shown, radar system 200 includes a receive path that includes receive antenna 202 that interfaced to downconverter 206 via antenna port 204. The output of downconverter 206 is coupled to the input of signal processing path 210 and interference detection path 212. During normal operation, reflected radar signals received by receive antenna 202 are downconverted by downconverter 206 and processed by signal processing path 210. However, during interference detection, interference signals received by receive antenna 202 are downconverted by downconverter 206, and the power of the downconverter interference signals are evaluated by a separate interference detection path 212.

Radar system 200 also includes a transmit path that includes transmitter 234 that is coupled to transmit antenna 230 via antenna port 232. During normal operation, transmitter 234 transmits a radar signal via transmit antenna 230 while receive antenna 202 receives the reflected radar signal. In some embodiments, transmitter 234 is disabled when radar system 200 is actively measuring the interference. However, in other embodiments, interference measurement may be performed simultaneously with normal radar operation and transmitter 234 remains enabled, which is explained further below.

Frequency generator 208 provides a local oscillator (LO) signal to transmitter 234 and a receive LO signal to downconverter 206. In various embodiments, frequency generator 208 is configured to produce LO signals having a frequency range of between about 76 GHz and about 81 GHz; however, frequencies outside of this range may be implemented depending on the particular system and its specifications. Frequency generator 208 may include, for example, a phase-locked-loop (PLL) based frequency generator that includes PLL circuitry and an RF voltage controlled oscillator (VCO) as known in the art. Frequency generator 208 also includes frequency control circuitry that controls the frequency of the receive LO signal to support embodiment interference frequency measurements s described below. In embodiments that utilize FMCW radar techniques, frequency generator 208 may also include frequency control circuitry that generates frequency chirps. In various embodiments, downconverter 206 coupled to the receive LO signal produced by frequency generator 208, and may be implemented using a real or quadrature mixer circuit according to systems and methods known in the art. In some embodiments, downconverter 206 is configured to mix the received radar signals to frequencies below about 20 MHz. Alternatively, downconverter may be configured to mix the received radar signals to frequencies outside of this range.

Processor 224, which is also referred to as a controller, receives data produced by interference detection path 212 and controls various aspects of radar system 200 based on the received and/or based on commands received via digital interface 226 from a digital interface bus. For example, processor 224 may control the frequency of the LO signals produced by frequency generator 208 and control the activation of transmitter 234. Digital interface 226 may also transmit the results of radar measurements performed by embodiment radar system 200 as well as system status information. Digital interface 226 may be implemented, for example, according to various digital bus standards, such as SPI, USB, BT, WiFi, WigiG, I3C, LVDS and MIPI. Alternatively, other bus types and standards may be used.

In some embodiments, signal processing path 210, also referred to as a receive path or a first signal path, performs signal processing to evaluate reflected radar signals. As shown, signal processing path 210 includes analog frontend 214, analog-to-digital converter 216 and digital signal processor 218. Analog frontend 214 includes analog circuitry configured to receive, filter and/or amplify the intermediate frequency (IF) signal produced by downconverter 206. In some embodiments, analog frontend 214 includes an anti-alias filter that band limits the IF signal to a bandwidth of less than or equal to one-half of the sampling frequency $f_s$ of analog-to-digital converter 216. Digital signal processor 218 performs the requisite signal processing to analyze the received radar signal. Such signal processing may include, for example, a range fast Fourier transforms (FFTs), Doppler FFTs, and other signal processing algorithms in the art to determine the location and/or velocity of objects detected by radar system 200.

Interference detection path 212, also referred to as a second signal path, is configured to detect the power of the IF signal produced by downconverter 206. As shown, interference detection path 212 includes power detector 220 and threshold detector 222. In some embodiments, interference detection path 212 may include one or more bandpass filters as described further below. In various embodiments, interference detection path 212 has a larger bandwidth than signal processing path 210. For example, in one embodiment, signal processing path 210 has bandwidth of a most $f_s/2$, which is a one-half of the sampling frequency $f_s$ of analog-to-digital converter 216, while interference detection path 212 has a bandwidth $B_{MIX}$, which is the bandwidth of the output of downconverter 206. Bandwidth $B_{MIX}$ may also be referred to as a first frequency bandwidth, and the bandwidth of signal processing path 210, which is $f_s/2$ or less, may also be referred to as a second frequency bandwidth. In various embodiments, bandwidth $B_{MIX}$ of interference detection path 212 is larger or much larger than bandwidth $f_s/2$ of signal processing path 210. By using a larger bandwidth, the presence of interference can be quickly detected over a large range of frequencies. In some embodiments, interference detection path 212 is implemented using an analog signal path. However, in alternative embodiments, some or all of interference detection path 212 may be implemented digitally.

During operation, power detector 220 measures the signal power present at the output of downconverter 206, and threshold detector 222 compares the measures signal power to a threshold. In some embodiments, the input to power detector is filtered by filter 221. The measurements and data produced by power detector 220 and/or threshold detector 222 may be used as an interference metric, or may be used to form an interference metric by embodiment radar system 200. Because interference signals produced by other radar systems have a strong amplitude compared to the channel noise as well as the intrinsic noise of the transceiver, a simple thresholding may be sufficient to detect interference in many embodiments. Power detector 220 may be implemented, for example using an analog received signal strength indication (RSSI) circuit known in the art, such as a diode detector or a logarithmic amplifier-based signal strength detector. Threshold detector 222 may be implemented using one or more comparators configured to compare the output of power detector 220 with a predetermined threshold to produce an interference indication. In some embodiments, the interference indication may be a single bit value that indicates whether or not the detected power exceeds a particular threshold. In order embodiments, the interference indication may be multi-bit signal that provides information related to the amplitude or the relative amplitude of the detected interference power. Alternatively, threshold detector 222 may be implemented using a low speed analog to digital converter and a digital comparator, or may provide a digitized measurement of the detected interference power to processor 224 directly.

Transmitter 234 is coupled to frequency generator 208 and is configured transmit signal TX LO over transmit antenna 230. Transmitter 234 may be implemented, for example, using an RF power amplifier (PA) circuit known in the art. Transmit antenna 230 and/or receive antenna 202 may be implemented using radar antenna structures know in the art. In one example embodiment, transmit antenna 230 and receive antenna 202 may each be implemented using a patch antenna or a plurality of patch antennas arranged in an array. In some embodiments, embodiment radar system 200 may be implemented using multiple transmitters, transmit antennas, receivers and/or receive antennas in order to implement phase array beam steering during normal operation. In such embodiments, all transmitters and all but one receiver circuits may be disabled during interference measurements, such that a single receiver circuit containing an embodiment separate interference detection path 212 is active. Alternatively, a larger subset or transmitters and/or receivers may be active during spectrum measurements depending on the particular embodiment and it specifications.

The various components of radar system 200 may be partitioned in various ways. For example, the RF components of radar system 200 may be implemented on one or more RF integrated circuits (RFICs), antennas 202 and 230 may be disposed on a circuit board, and processor 224 and/or DSP 218 may be implemented using a processor, a microprocessor, a digital signal processor and/or a custom logic circuit disposed on one or more integrated circuits/semiconductor substrates. Processor 224 may include a processor that executes instructions in an executable program stored in a non-transitory computer readable storage medium, such as a memory to perform various embodiment functions disclosed herein. In some embodiments, however, all or part of the functionality of processor may be incorporated on the same integrated circuit/semiconductor substrate on which radar system 200 is disposed.

In some embodiments, some or all portions of radar system 200 may be implemented in a package. In some embodiments, the various RF and/or baseband components of radar system 200 may be implemented as one or more integrated circuits disposed on a circuit board, and transmit antenna 230 and receive antenna 202 may be implemented on the circuit board adjacent to the integrated circuits. In some embodiments, transmitter 234, frequency generator 208, downconverter 206, and interference detection path 212 are formed on a same radar front-end integrated circuit (IC) die. Transmit antenna 230 and receive antenna 202 may also be a part of the radar front-end IC die, or may be implemented as separate antennas disposed over or adjacent to the radar front-end IC die. The radar front-end IC die may further include conductive layers, such as redistribution layers (RDLs), used for routing and/or for the implementation of various passive or active devices of radar system 200. In an embodiment, transmit antenna 230 and receive antenna 202 may be implemented using the RDLs of the radar front-end IC die.

Figure 3A:
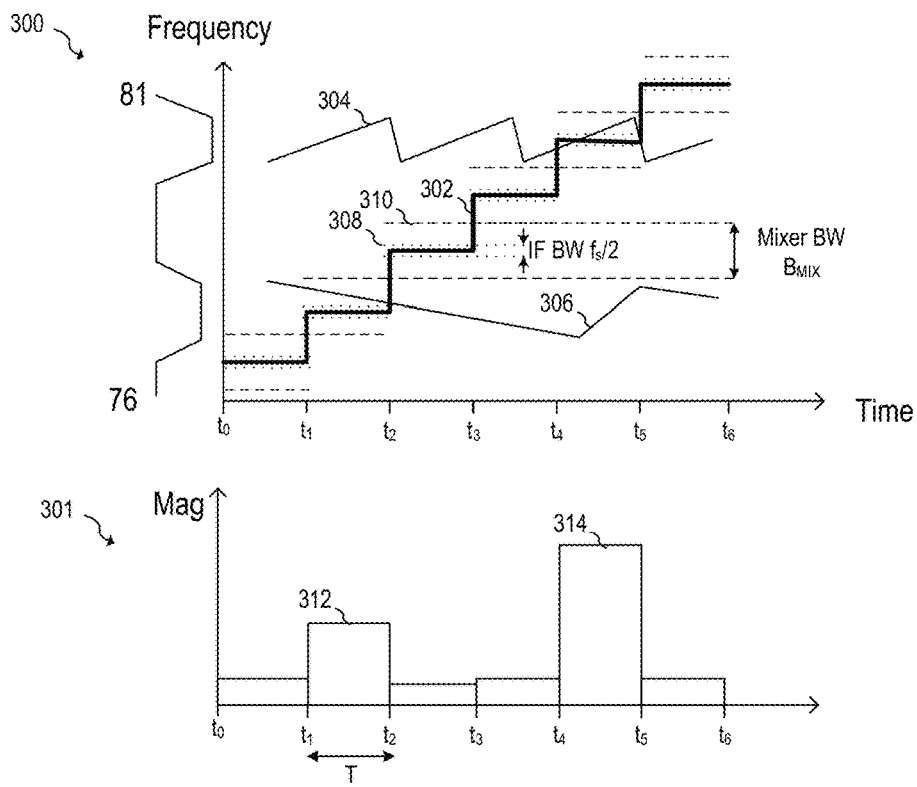
FIG. 3A illustrates a graph of monitored frequencies with respect to time for an embodiment in which an LO frequency is changes in discrete steps.

In some embodiments, the presence and frequency of interfering signals is performed by stepping the LO frequency over a plurality of discrete frequencies while maintaining each discrete frequency constant for a predetermined time and measuring the output of downconverter 206 at each frequency step. This concept is illustrated in FIG. 3A that shows a graph 300 of monitored frequencies with respect to time, and a graph 301 of measured downconverter signal level with respect to time. Trace 302 represents the receive LO frequency produced by frequency generator 208 and input to the LO port of downconverter 206, trace 304 represents a first received interfering signal, and trace 306 represents a second received interfering signal. Dotted lines 308 represent the IF bandwidth of signal processing path 210, which has an IF bandwidth of $f_s/2$; and dashed lines 210 represent a larger detection bandwidth $B_{MIX}$ seen at the output of downconverter 206 and measured by interference detection path 212. As shown, the receive LO frequency represented by trace 302 is incrementally stepped between about 76 GHz and about 81 GHz. In the depicted embodiment, the size of the frequency step is chosen such that the band edges (represented by dashed lines 210) of the bandwidth $B_{MIX}$ of downconverter 206 at one LO frequency overlap with or coincide with a band edge of the detection bandwidth $B_{MIX}$ of downconverter 206 at the next LO frequency in order to fully cover the entire measured radar spectrum. For example, the high band edge of one LO frequency coincides with or overlaps with the lower band edge of the next LO frequency. Alternatively, detection bandwidth $B_{MIX}$ band edges may be non-overlapping depending on the particular embodiment and its specifications.

As is further shown in FIG. 3A, between times $t_1$ and $t_2$, the interfering signal represented by trace 306 falls within detection bandwidth $B_{MIX}$, thereby increasing the detected interference signal power for this time period, as represented by the magnitude 312. Similarly, between times $t_4$ and $t_5$, the interfering signal represented by trace 304 falls within detection bandwidth $B_{MIX}$, thereby increasing the detected interference signal power for this time period, as represented by the magnitude 314. Transmitter 234 may be disabled while these measurements are made. Based on these measurements, embodiment radar system 200 can determine which portions of the spectrum or unoccupied and/or lightly occupied and schedule future transmissions to use these unoccupied and/or lightly occupied frequency ranges.

Figure 3B:
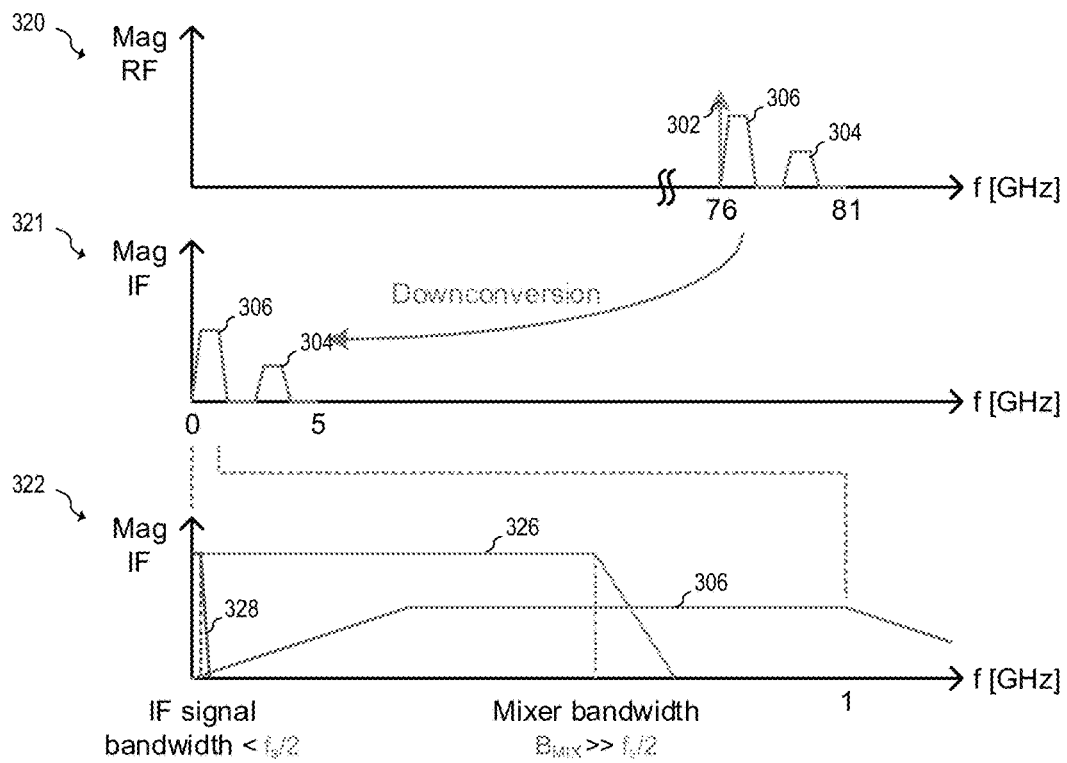
FIG. 3B illustrates spectral content graphs that illustrate the downconversion of signals in an embodiment radar system.

FIG. 3B shows spectral content graphs 320, 321 and 322 that illustrate the interference detection operation of an embodiment radar system. Each graph represents the spectral magnitude of various signals with respect to frequency. Graph 320 illustrates the RF spectrum in which trace 302 represents the receive LO signal set to 76 GHz, trace 304 represents the first received interfering signal, and trace 306 represents the second received interfering signal discussed above with respect to FIG. 3A. Graph 321 illustrates the downconverter IF spectrum in which the spectra 304 and 306 of the first and second interfering signals are downconverted to IF frequencies up to 5 GHz. Graph 322 is an expanded graph of graph 321 that shows the first 1 GHz of the downconverter IF spectrum. Trace 306 represents the spectrum of the second received interference signal, trace 326 represents the larger detection bandwidth $B_{MIX}$ measured by interference detection path 212 and trace 328 represents the smaller IF signal bandwidth of signal processing path 210. It should be further understood that illustrated detection range of between about 76 GHz and about 81 GHz, the illustrated detection bandwidth and IF signal bandwidth, and frequency and characteristics of the interfering signals are just illustrative examples. In other embodiments, different detection frequency ranges and bandwidths may be implemented according to the specific embodiment and its specifications. Moreover, the characteristics of the interfering signals may be different, as well.

Figure 3C:
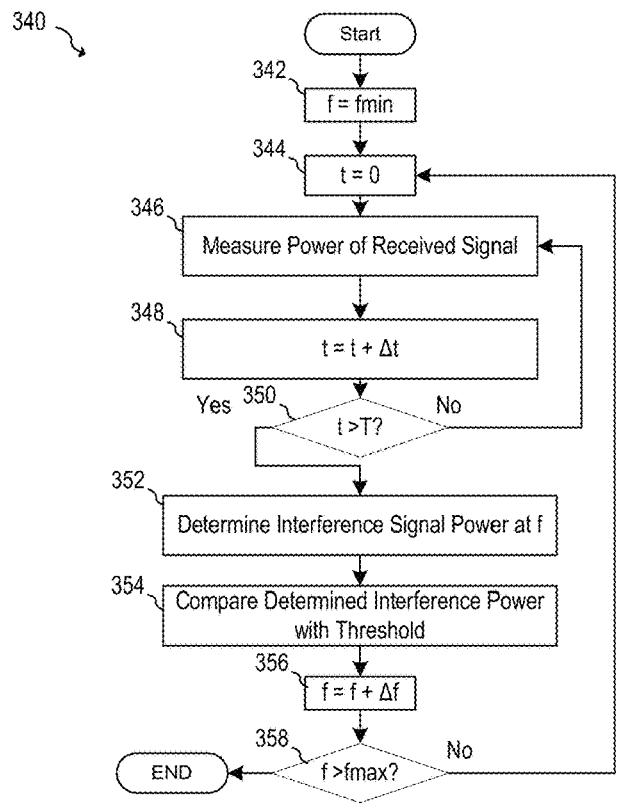
FIG. 3C illustrates a flowchart of a method of operating an embodiment radar system.

FIG. 3C illustrates a method 340 of measuring interference as described above with respect to FIG. 3A. In step 342 a frequency variable f representing the receive LO frequency is set to fmin, and in step 344 a time variable t is set to zero. In step 346 the power of the receive signal is measured, for example, using power detector 220 in signal processing path 210. In step 348, time variable t is incremented by Δt, and in step 350, time variable t is compared with time interval T. If time variable t does not exceed time interval T, then the power of the receive signal continues to be measured in step 346. If, on the other hand, time variable t exceeds time interval T, the method proceeds to step 352 in which the interference signal power is determined for the present LO frequency f. In some embodiments, this interference signal power is determined by threshold detector 222. In some embodiments, the result of this comparison and/or the magnitude of the detected power are stored in memory at this point as an interference metric. The frequency variable f is incremented by Δf in step 356, and is then compared with frequency fmax. If the frequency variable f exceeds fmax, then the interference measurement is completed. Otherwise, a new measurement is initiated starting at step 344.

In one example embodiment, time interval T is about 30 μsec, frequency fmin is about 76 GHz and frequency fmax is about 81 GHz. It should be understood that these values are just example values, and that different values may be used in other embodiments. In alternative embodiments, the measurement frequency can be decremented instead of incremented such that the receive LO frequency starts at f=fmax and ends at f=fmin.

Figure 4:
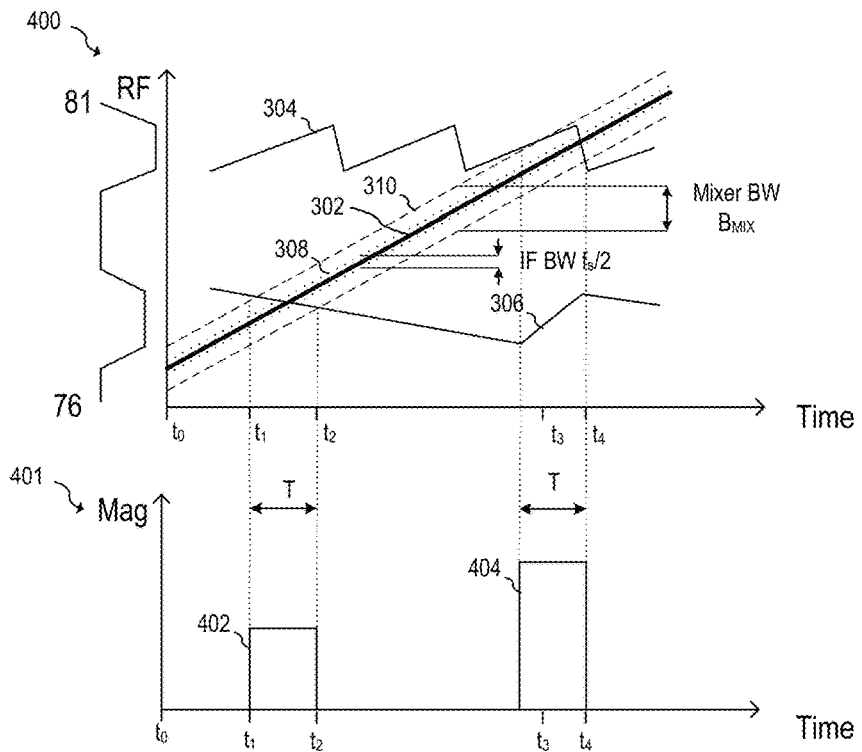
FIG. 4 illustrates a graph of monitored frequencies with respect to time for an embodiment in which the LO frequency continuously swept.

In some embodiments, the presence and frequency of interfering signals is detected by continuously sweeping the LO frequency over the measured frequency range and measuring the output of downconverter 206 during the frequency sweep. This concept is illustrated in FIG. 4 that shows a graph 400 of monitored frequencies with respect to time, and a graph 401 of measured downconverter signal level with respect to time. Trace 302 represents the receive LO frequency produced by frequency generator 208 and input to the LO port of downconverter 206, trace 304 represents a first received interfering signal, and trace 306 represents a second received interfering signal. Dotted lines 308 represent the IF bandwidth of signal processing path 210, which has an IF bandwidth of $f_s/2$; and dashed lines 210 represent a larger detection bandwidth $B_{MIX}$ seen at the output of downconverter 206 and measured by interference detection path 212. As shown, the receive LO frequency represented by trace 302 is continuously swept between about 76 GHz and about 79 GHz. While FIG. 4 illustrates the receive LO frequency as continuously increasing from 76 GHz to 79 GHz, it should be understood that in alternative embodiments, the receive LO frequency may be swept over a different range of frequencies and/or may be configured to continuously decrease from a higher frequency to a lower frequency.

In some embodiments, the power within detection bandwidth $B_{MIX}$ is periodically sampled at sampling intervals T as shown in graph 401. For example, between times $t_1$ and $t_2$, when the interfering signal represented by trace 306 falls within detection bandwidth $B_{MIX}$, the detected interference signal power for this time period increases, as represented by the magnitude 402. Similarly, between times $t_4$ and $t_5$, when the interfering signal represented by trace 304 falls within detection bandwidth $B_{MIX}$, detected interference signal power for this time period increases, as represented by the magnitude 404. Similar to the embodiment described in FIG. 3A, transmitter 234 may be disabled while these measurements are made. Based on these measurements, embodiment radar system 200 can determine which portions of the spectrum are unoccupied and/or lightly occupied and schedule future transmissions to use these unoccupied and/or lightly occupied frequency ranges. In alternative embodiments, the magnitude of the power within detection bandwidth $B_{MIX}$ may be continuously monitored instead of periodically monitored.

Figure 5A:
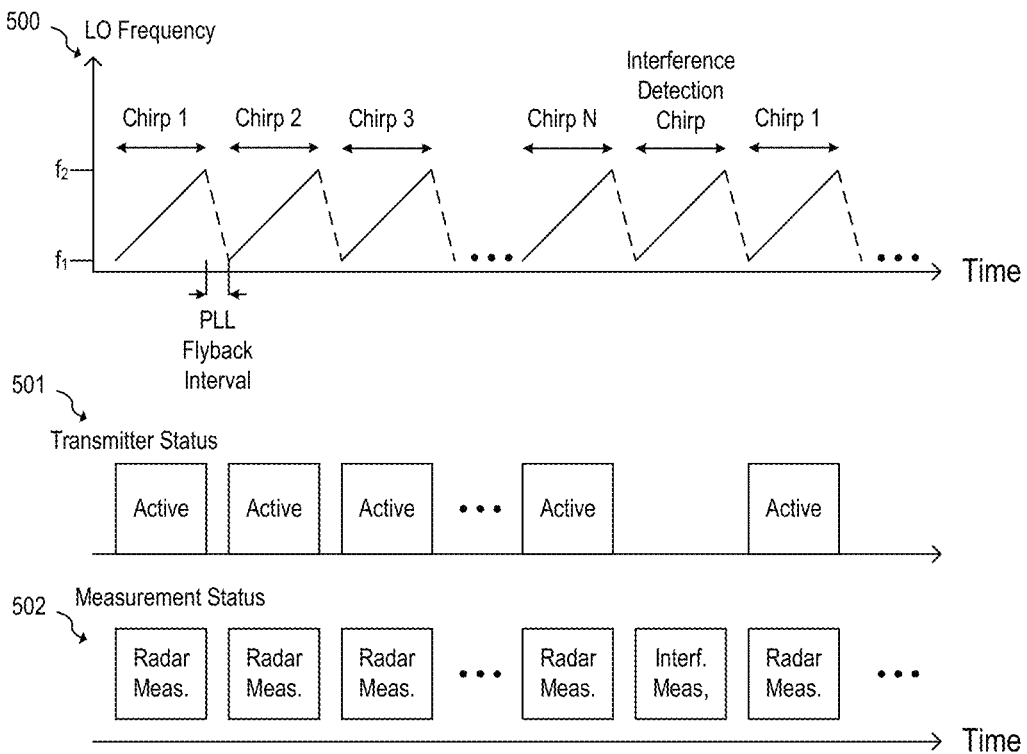
FIGS. 5A and 5B illustrate timing diagrams that illustrate how interference measurements are scheduled with the respect to normal radar measurements.

In various embodiments, interference measurements may be periodically scheduled to occur after a predetermined number of radar measurements as shown in FIG. 5A that illustrates graph 500 showing LO frequency with respect to time, graph 501 showing the status of transmitter 234, graph 502 showing the functional mode of the radar system with respect to time. During a radar measurement, the transmitter of radar system 200 is activated, chirps of increasing frequency (from frequency $f_1$ to frequency $f_2$) are transmitted in the intervals designated as Chirp 1 to Chirp N, and corresponding radar measurements are made via signal processing path 210, wherein N is any integer. Between each chirp, the LO frequency decreases from frequency $f_2$ back to frequency $f_1$ as frequency generator 208 is reset during a PLL flyback interval. After a series of N chirps, an interference measurement is performed while the transmitter is deactivated. While the interference detection chirp is shown as a frequency chirp between frequencies $f_1$ and $f_2$, the interference detection chirp may occur over a different frequency range from the other measurement chirps. For example, in some embodiments, an expanded range of frequencies may be covered to measure interference in frequencies outside of the range of $f_1$ to $f_2$. In such a case, the minimum chirp frequency for the interference detection chirp may be less than $f_1$ and/or the maximum chirp frequency for the interference detection chirp may be greater than $f_2$. It should also be understood that in alternative embodiments, chirp 1 through chirp N, as well as the interference detection chirp may be arranged to decrease in frequency from $f_2$ to $f_1$. In such embodiments, the LO frequency increases from frequency $f_1$ back to frequency $f_2$ as frequency generator 208 is reset during the PLL flyback interval.

Figure 5B:
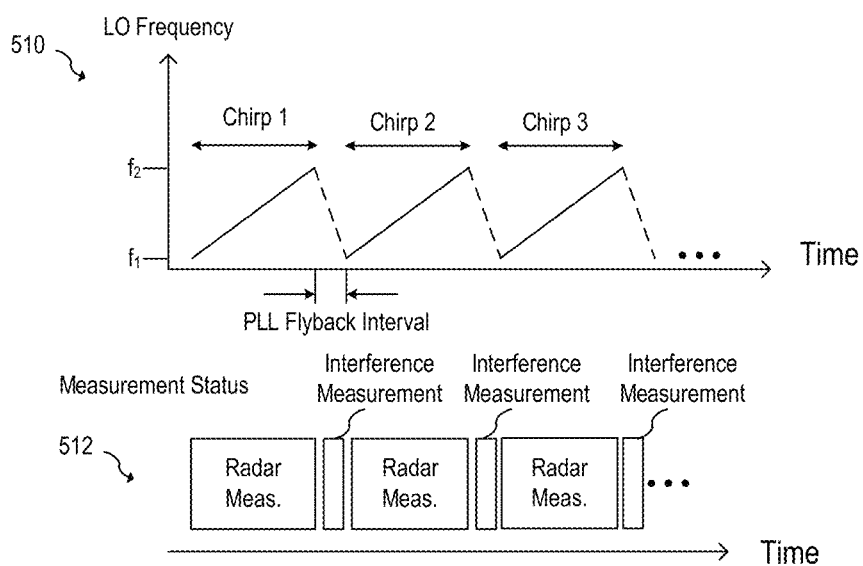

In some embodiments, interference measurements can be made during the PLL flyback interval as shown in FIG. 5B that illustrates graph 510 showing LO frequency with respect to time and graph 512 showing the functional mode of the radar system with respect to time. During a radar measurement, the transmitter of radar system 200 is activated, chirps of increasing frequency (from frequency $f_1$ to frequency $f_2$) are transmitted, and corresponding radar measurements are made via signal processing path 210. Between each chirp, the LO frequency decreases from frequency $f_2$ back to frequency $f_1$ as frequency generator 208 is reset during the PLL flyback interval. During this PLL flyback interval, transmitter 234 is turned-off and interference detection path 212 is activated to measure interference in the frequency range of $f_1$ to $f_2$. In some embodiments, additional interference detection measurements may be made after N chirps in order to measure interference outside of the frequency range of $f_1$ to $f_2$. Again, in alternative embodiments, the frequency profile of the measurement chirps may be inverted such that the LO frequency decreases from $f_2$ to $f_1$ during radar measurements and increases from $f_1$ to $f_2$ during the PLL flyback interval.

As mentioned above with respect to FIG. 2, downconverter 206 may be implemented using a real or quadrature mixer circuit. In some embodiments, a quadrature mixer circuit 600 (also known as an I/Q demodulator or a single-sideband mixer) can be used to implement downconverter 206. Using quadrature mixer circuit 600 may be helpful in resolving interference in some embodiments as is explained below. As shown, quadrature mixer circuit 600 includes a 90 degree power splitter 602 that is configured to split that power of the RF signal and produce in-phase RF signal RF_I and a quadrature RF signal RF_Q having a net phase shift of 90° between each other. Phase shifters 606 and 608 are configured to phase shift the incoming LO signal by +45° and −45°, respectively in order to produce an in-phase LO signal LO_I and a quadrature LO signal LO_Q having a net phase shift of 90° between each other. In-phase mixer 610 downconverts the in-phase RF signal RF_I according to in-phase LO signal LO_I to produce in-phase IF signal IF_I and quadrature mixer 610 downconverts the quadrature RF signal RF_Q according to quadrature LO signal LO_Q to produce quadrature IF signal IF_Q. In-phase IF signal IF_I and quadrature IF signal IF_Q are summed using summer 614 to produce the output IF signal. In some embodiments the output of summer 614 is lowpass filtered using lowpass filter 616.

Power splitter 602 can be implemented using power splitter circuits known in the art, while phase shifters 606 and 608 can be implemented using phase shifter circuits and methods know in the art. For example, power splitter 602 may be a 90° hybrid coupler implemented, for example, using on-chip transmission lines. Phase shifters 606 and 608 may be implemented using a polyphase filter as known in the art. Mixers 610 and 612 may be implemented using mixer circuits known in the art, such as a Gilbert cell-based mixer, and summer 614 may be implemented using any circuit structure suitable for summing two signals. For example, in some embodiments, the function of summer 614 may be implemented by connecting the outputs of mixers 610 and 612 together at the same node. Optional lowpass filter 616, which can be used to define the output bandwidth $B_{MIX}$ of mixer 600, may be implemented, for example, using an RC filter, and LC filter, or other known filter structure.

In various embodiments, mixer 600 can be configured to downconvert an upper side band, which are frequencies received that are greater than the LO frequency, and reject a lower side band, which are frequencies received that are less than the LO frequency. Alternatively, mixer can be configured to downconvert the lower side band and reject the upper side band. The selection of which side band to down convert may be affected by the judicious selection of the relative phases of phase shifters 606 and 608, the phases of signals RF_I and RF_Q produced by power splitter 602, as well as by adjusting the polarity of the output of mixers 610 and 612. In other embodiments, the in-phase IF signal IF_I and quadrature IF signal IF_Q can be processed separately to separately resolve the upper and lower side bands.

Figure 6A:
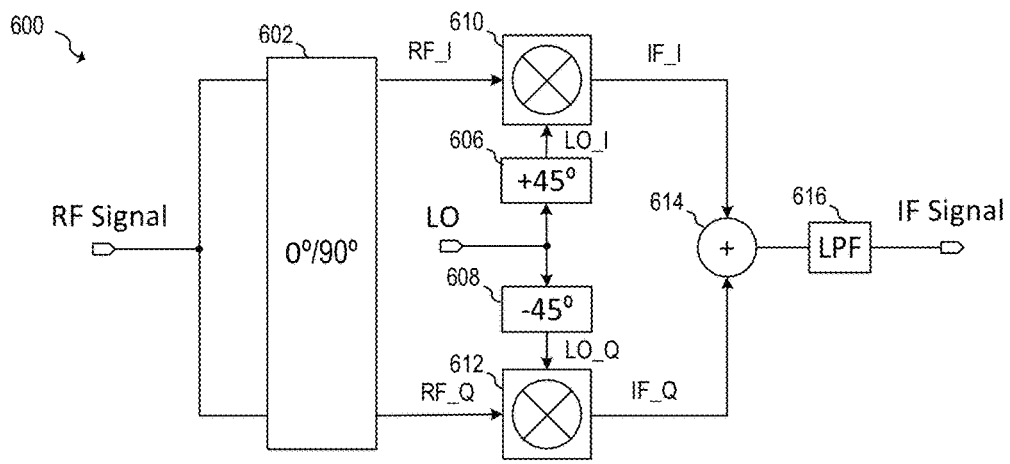
FIG. 6A illustrates a schematic of an embodiment quadrature mixer.

It should be understood that the topology of quadrature mixer circuit 600 depicted in FIG. 6A is just one of a number of quadrature mixer circuits that may be used to implement embodiment mixing circuits. Other quadrature mixer circuits known in the art may also be used.

Figure 6B:
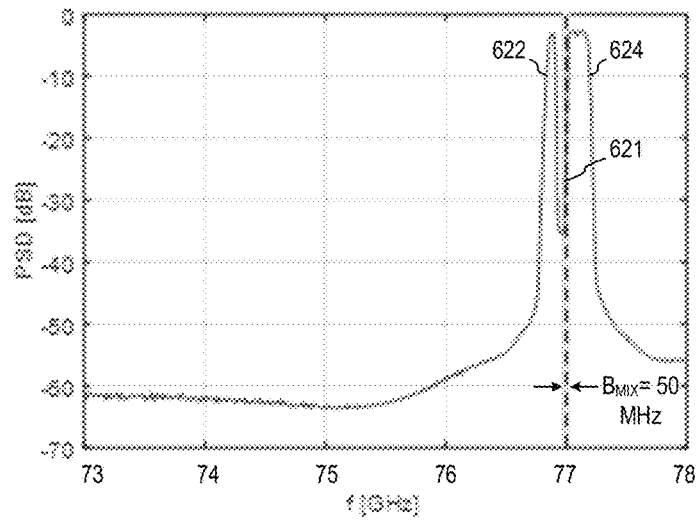
FIGS. 6B to 6E illustrate spectral graphs that illustrate the performance of an embodiment quadrature mixer.

One of the benefits of implementing downconverter 206 using a quadrature mixer circuit, such as quadrature mixer circuit 600 illustrated in FIG. 6A, is the ability to resolve received frequencies above and below the LO frequency. FIG. 6B illustrates a passband spectrum that includes an interference spectrum 622 having frequencies below LO frequency 621, and an interference spectrum 624 having frequencies above LO frequency 621. The mixer bandwidth $B_{MIX}$ is represented has having bandwidth of 50 MHz. Thus, interference spectrum 622 is shown to be outside the mixer bandwidth $B_{MIX}$, while a portion of interference spectrum 624 is shown to be within mixer bandwidth $B_{MIX}$.

Figure 6C:
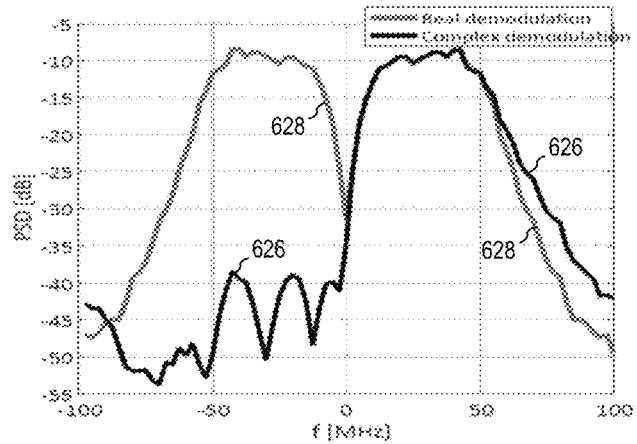

FIG. 6C illustrates the downconverted spectrum of the portion of interference spectrum 624 that falls within the mixer bandwidth $B_{MIX}$ that includes the downconverted spectrum 628 produced by a real mixer and the downconverted spectrum 626 produced by a complex mixer. While the embodiment of FIG. 6C illustrates a case where complex downconverter produces a zero IF signal as an illustrative example, it should be understood that complex mixers can be used to produce non-zero IF signals. As shown, the downconverted spectrum 626 produced by the complex mixer resolves the entire structure of the downconverted portion interference spectrum 624 and, thus, most of the downconverted power appears at frequencies greater than zero. The downconverted spectrum 628 produced by the real mixer, on the other hand, does not retain the spectral structure of interference spectrum 624, thus, the downconverted portion of interference spectrum 624 symmetrically appears at frequencies above and below zero. Even though the downconverted spectrum 628 of the real mixer does not resolve the entire spectral shape of the downconverted portion of interference spectrum 624, the resulting measurement error may be relatively small in some embodiments. Thus, for mixer implementations using relatively low bandwidths for $B_{MIX}$, a real mixer of lower cost and complexity may be used to implement downconverter 206 shown in FIG. 2. However, the tradeoff for using a lower mixer bandwidth for $B_{MIX}$ is that more frequency measurements are used to measure a particular frequency range.

Figure 6D:
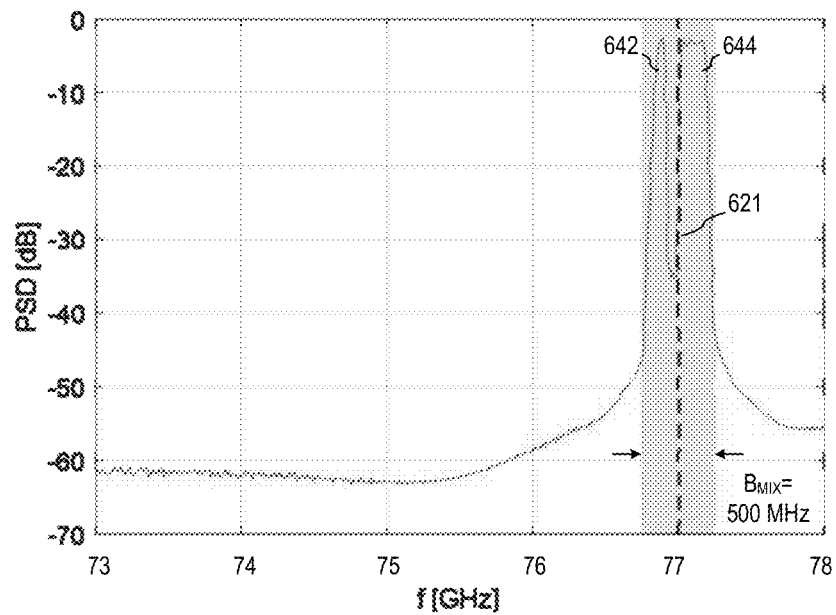

FIG. 6D illustrates a passband spectrum that includes spectrum 642 having frequencies below LO frequency 621, and spectrum 644 having frequencies above LO frequency 621, which is similar to the case of FIG. 6B. In this case however, the mixer bandwidth $B_{MIX}$ has a wider bandwidth of 500 MHz, thus both spectra 642 and 644 fall within mixer bandwidth $B_{MIX}$.

Figure 6E:
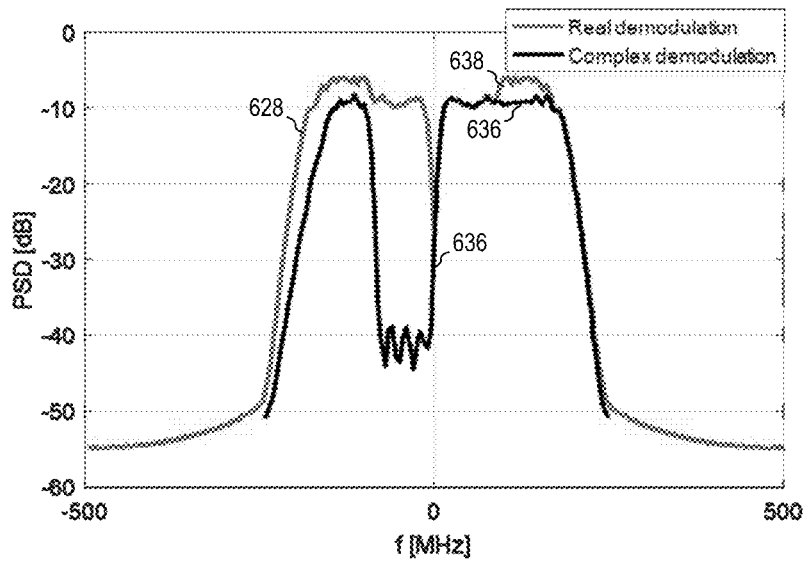

FIG. 6E illustrates the downconverted spectrum 638 produced by a real mixer and the downconverted spectrum 636 produced by a complex mixer for the wider mixer bandwidth $B_{MIX}$ of 500 MHz. As shown, the downconverted spectrum 626 produced by the complex mixer resolves the entire structure of spectra 644 and 642, while the downconverted spectrum 628 produced by the real mixer, on the other hand, does not retain the spectral structure of spectra 644 and 642. In this case, the measurement error of the power of spectra 644 and 642 using a real mixer for the wider mixer bandwidth $B_{MIX}$ of 500 MHz is greater than the measurement error of the power of the downconverted portion of spectrum 644 using the narrower mixer bandwidth $B_{MIX}$ of 50 MHz. However, in some embodiments, interference measurements over some frequency ranges can be made using fewer iterations using the wider bandwidth of 500 MHz instead of the narrower bandwidth of 50 MHz. Accordingly, the selection of whether the implement downconverter 206 as a real or quadrature mixer and the selection of mixer bandwidth $B_{MIX}$ can be made by trading off mixer complexity, number of measurement iterations and measurement error in some cases.

Figure 7:
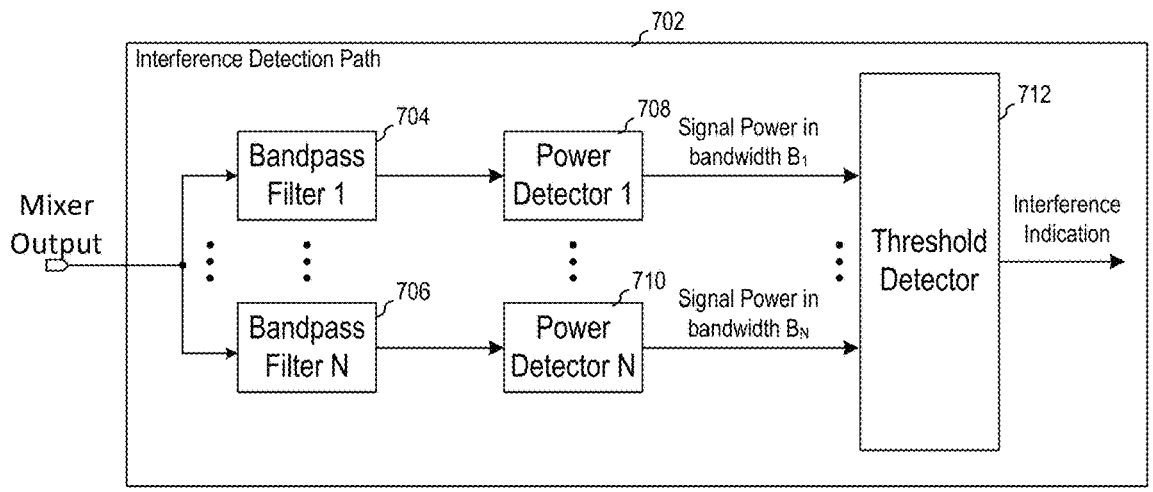
FIG. 7 illustrates a block diagram of an embodiment interference detection path that utilizes a plurality of bandpass filters.

In some embodiments, the interference spectrum may be evaluated within multiple bands in order to more precisely track and predict the trajectory of measured interference and/or to perform interference measurements simultaneously with radar measurements. FIG. 7 illustrates interference detection path 702 that can be used to implement separate interference detection path 212 shown in FIG. 2. As shown, interference detection path 702 has two or more bandpass filters 704 and 706 that filter two or more corresponding frequency bands at the output of downconverter 206, and two or more corresponding power detectors 708 and 710 that measure the filtered downconverted signal level filtered by bandpass filters 704 and 706. The measured power detected by power detectors 708 and 710 may be compared to a predetermined threshold by threshold detector 712 and/or may be digitized by an analog-to-digital converter (not shown) for further processing. Any number of bandpass filters may be used depending on the particular embodiment and its specifications.

In some embodiments, bandpass filter 704 may have a passband that includes frequency band $B_1$ having frequencies higher than the IF passband of signal processing path 210, and a lower stopband that rejects or attenuates the IF passband of signal processing path 210. Similarly, bandpass filter 706 may have a passband that includes frequency band $B_2$ having frequencies lower than the IF passband of signal processing path 210, and an upper stopband that rejects or attenuates the IF passband of signal processing path 210. Because the IF passband is rejected by bandpass filter 704 and 706, signal power in the IF passband will not significantly affect interference measurements taken at the output of bandpass filters 704 and 706. Accordingly, the transmitter of embodiment radar system 200 can remain active during interference measurements and/or interference measurements can be made at the same time as radar measurements. In such embodiments, a quadrature mixer may be used to implement downconverter 206 in order to resolve the frequency content in the upper and lower sidebands.

Figure 8:
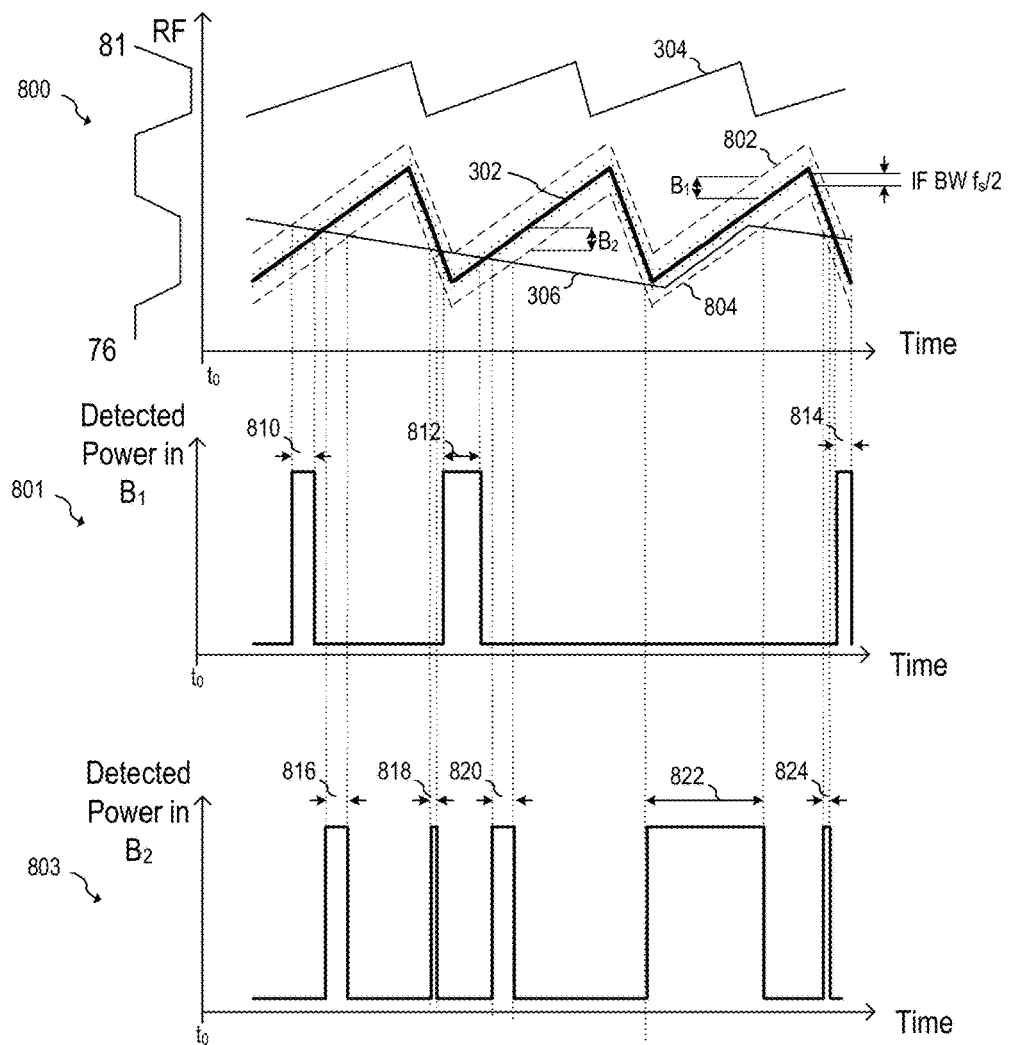
FIG. 8 illustrates a graph of monitored frequencies with respect to time for an embodiment in which the embodiment interference detection path utilizes a plurality of bandpass filters.

FIG. 8 graphically illustrates the operation of a system in which interference measurements are using a system that has a plurality of bandpass filters in the separate interference detection path 212, such as illustrated with respect to interference detection path 702 in FIG. 7. As shown, FIG. 8 has a graph 800 of monitored frequencies with respect to time, a graph 801 of measured downconverter signal levels in a first frequency band $B_1$ having frequencies greater than the receive LO frequency, and a graph 803 of measured downconverter signal levels in a second frequency band $B_2$ having frequencies lower than the receive LO frequency.

Trace 302 represents the receive LO frequency produced by frequency generator 208 and input to the LO port of downconverter 206, trace 304 represents a first received interfering signal, and trace 306 represents a second received interfering signal. Dotted lines 308 represent the IF bandwidth of signal processing path 210, which has an IF bandwidth of $f_s/2$. Frequency band $B_1$ is shown as a frequency band disposed between the high end of the IF bandwidth and dashed line 802 above trace 302 representing the LO frequency, whereas frequency band $B_2$ is shown as a frequency band disposed between the low end of the IF bandwidth and dashed line 804 below trace 302 representing the LO frequency. In some embodiments, frequency band $B_1$ is within the passband of bandpass filter 704 and frequency band $B_2$ is within the passband of bandpass filter 706 described above with respect to FIG. 7.

As shown, the receive LO frequency represented by trace 302 is continuously swept between about 76 GHz and about 79 GHz. During operation, signal processing path 210 processes the received reflected radar signal within the IF bandwidth and interference detection path 212 detects the interference signals within the frequency bands $B_1$, and $B_2$. While FIG. 8 illustrates the receive LO frequency as continuously increasing from 76 GHz to 79 GHz, it should be understood that in alternative embodiments, the receive LO frequency may be swept over a different range of frequencies and/or may be configured to continuously decrease from a higher frequency to a lower frequency.

As shown in graph 801, when the second interfering signal represented by trace 306 falls within frequency band $B_1$, at time intervals 810, 812 and 814, power is detected by power detector 708. Similarly, as shown in graph 802, when the second interfering signal represented by trace 306 falls within frequency band $B_2$ at time intervals 816, 818, 820, 822 and 824, power is detected by power detector 710. By analyzing the relationship between the various time intervals in which interference power is detected, estimates can be made regarding the frequency trajectory of the measured interference signals. For example, in one embodiment the frequency trajectory is determined by recording the detected frequency versus time for each tracked interference signal and applying a linear prediction algorithm or performing a curve fit of the recorded values in order to estimate a future interference frequency. In some embodiments, the current interference frequencies and the estimated/predicted frequencies can be represented on a two-dimensional time-frequency grid, such as the graph shown in FIG. 1C. Based on these predictions, free regions can be identified.

Predicting the frequency trajectory of the measured interference signals may be useful, for example, in some interference mitigation algorithms. For example, when power is detected in frequency band $B_1$, followed closely by power being detected in frequency band $B_2$ and vice-versa, it can be inferred by the system that an interference has fallen within the IF bandwidth at between the time that power ceases to be detected in one band and begins to be detected in another band. Knowledge of this interference at this particular time may allow the system to discard the radar measurements during this time period or assign a lower weight to the radar measurements, or to aid interference mitigation algorithms. During operation, the power detected in frequency bands $B_1$, and $B_2$ may be stored in memory as interference metrics.

In some embodiments, if the length of the time intervals and/or power measured within frequency bands $B_1$, and/or $B_2$ exceeds a predetermined threshold, the frequency range of operation can be changed to a different frequency range. In such cases, the LO can be swept over a wider frequency range (e.g. from 76 GHz to 81 GHz) than the limited frequency range used during normal radar operation in order to determine potentially available frequency ranges based on the power detected in frequency bands $B_1$, and $B_2$, as well as other interference metrics. This wider frequency sweep used to determine potentially available frequency ranges can be scheduled after a predetermined number of normal operation cycles, or may be scheduled on an as needed basis. The radar transmitter may be disabled during these wider frequency sweeps.

Figure 9A:
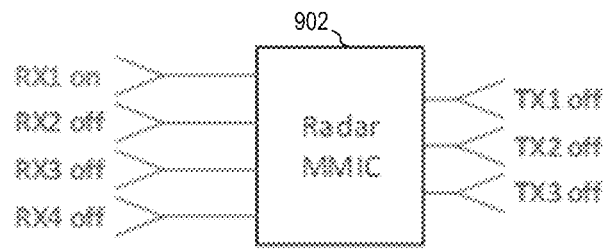
FIGS. 9A and 9B illustrate block diagrams of embodiment MMIC-based radar systems.

In some embodiments, the signal path including downconverter 206 and interference detection path 212 may be included in a radar system that has multiple transmitters and multiple receivers, such as shown in the block diagram of FIG. 9A that illustrates a radar millimeter wave integrated circuit 902 (MMIC) having four receive channels RX1, RX2, RX3 and RX4 and four transmit channels TX1, TX2, TX3 and TX4. During normal radar operation, all four receive channels RX1, RX2, RX3 and RX4 and all four transmit channels TX1, TX2, TX3 and TX4 may be active. However, in some embodiments, only one receive path, such as receive channel RX1, is active during interference detection and all transmit channels TX1, TX2, TX3 and TX4 are disabled.

Figure 9B:
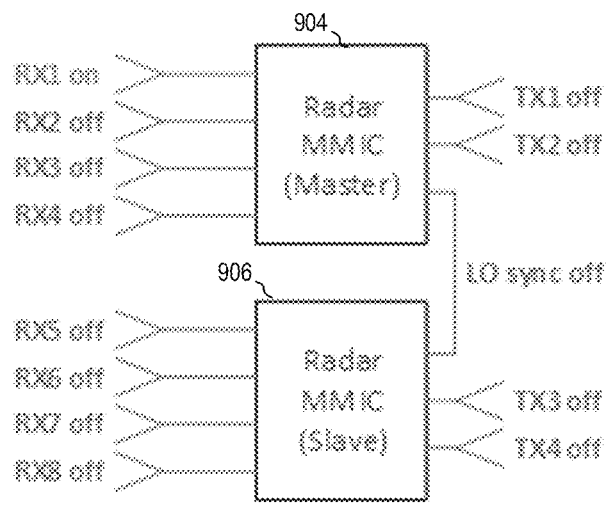

In some embodiments, a radar system may be configured to include more than one MMIC as shown in FIG. 9B. As shown, a master radar MMIC 904 includes four receive channels RX1, Rx2, Rx3 and Rx4 and four transmit channels TX1, TX2, TX3 and TX4, and a slave radar MMIC 906 coupled to master MMIC 906 has four additional receive channels RX5, RX6, RX7 and RX8 and four additional transmit channels TX5, TX6, TX7 and TX8. During normal radar operation, all eight receive channels RX1, RX2, RX3, RX4, RX5, RX6, RX7 and RX8, and all eight transmit channels TX1, TX2, TX3, TX4, TX5, TX6, TX7 and TX8 may be active. However, in some embodiments, only one receive path, such as receive channel RX1 (or any other one of the receive channels), is active during interference detection and all transmit channels TX1, TX2, TX3, TX4, TX5, TX6, TX7 and TX8 are disabled. It should be understood that the embodiments depicted in FIGS. 9A and 9B are just two examples of many possible embodiment MMIC based radar systems. In alternative embodiments, the MMIC based radar systems may have a different number of transmit and/or receive channels, and/or may contain any number of MMICs.

Figure 10:
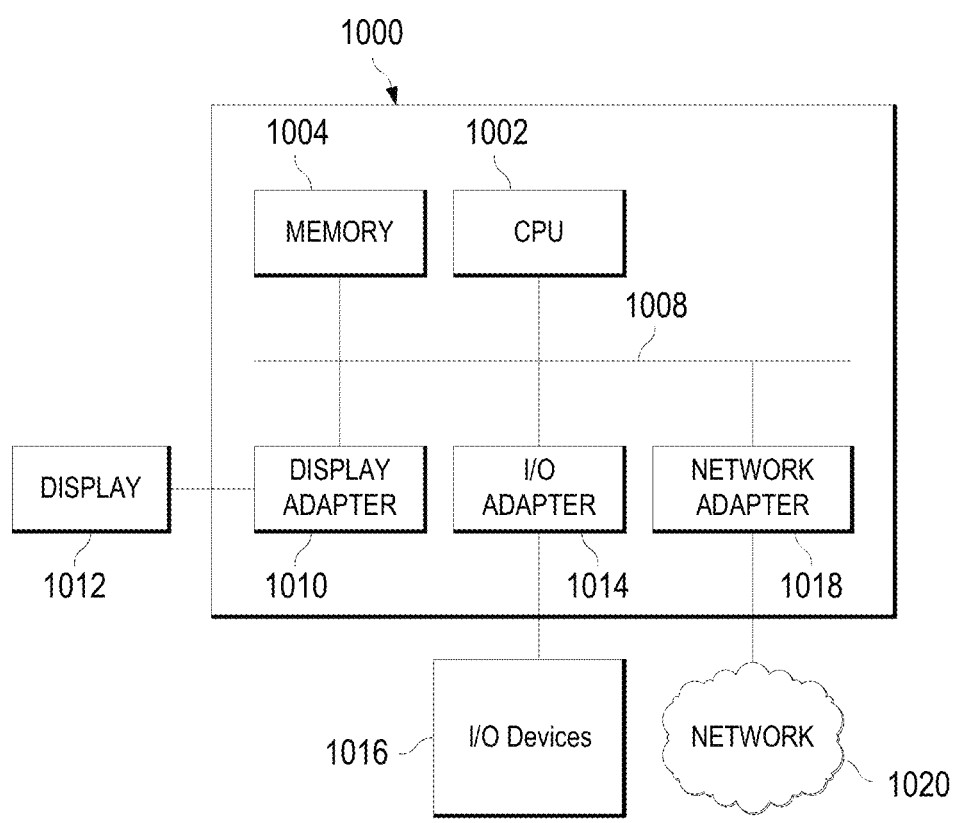
FIG. 10 illustrates a block diagram of a processing system that may be used to implement portions of embodiment radar systems Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

Referring now to FIG. 10, a block diagram of a processing system 1000 is provided in accordance with an embodiment of the present invention. The processing system 1000 depicts a general-purpose platform and the general components and functionality that may be used to implement portions of the embodiment radar system and/or an external computer or processing device interfaced to the embodiment radar system. For example, processing system 1000 may be used to implement processor 224, digital interface 226 and/or DSP 218 shown in FIG. 2. In some embodiments, processing system 1000 may be used to determine and evaluate embodiment interference metrics, control operation of the embodiment radar system, and determine potentially available frequency ranges based on interference metrics.

Processing system 1000 may include, for example, a central processing unit (CPU) 1002, and memory 1004 connected to a bus 1008, and may be configured to perform the processes discussed above. The processing system 1000 may further include, if desired or needed, a display adapter 1010 to provide connectivity to a local display 1012 and an input-output (I/O) Adapter 1014 to provide an input/output interface for one or more input/output devices 1016, such as a mouse, a keyboard, flash drive or the like.

The processing system 1000 may also include a network interface 1018, which may be implemented using a network adaptor configured to be coupled to a wired link, such as a network cable, USB interface, or the like, and/or a wireless/cellular link for communications with a network 1020. The network interface 1018 may also comprise a suitable receiver and transmitter for wireless communications. It should be noted that the processing system 1000 may include other components. For example, the processing system 1000 may include hardware components power supplies, cables, a motherboard, removable storage media, cases, and the like if implemented externally. These other components, although not shown, are considered part of the processing system 1000. In some embodiments, processing system 1000 may be implemented on a single monolithic semiconductor integrated circuit and/or on the same monolithic semiconductor integrated circuit as other disclosed system components.

Example embodiments of the present invention are summarized here. Other embodiments can also be understood from the entirety of the specification and the claims filed herein.

Example 1. A method of operating a radar system includes activating a transmitter to transmit a radar signal during a first time period, receiving a reflection of the radar signal from a radar antenna, downconverting the reflected radar signal, and digitally processing the downconverted reflected radar signal within a first frequency bandwidth using a first signal path. The method also includes deactivating the transmitter during a second time period, receiving a second signal from the radar antenna during the second time period, downconverting the second signal, measuring a power of the downconverted second signal within a second frequency bandwidth using a second signal path different from the first signal path, and determining an interference metric based on measuring the power.

Example 2. The method of example 1, where the second frequency bandwidth is wider than the first frequency bandwidth.

Example 3. The method of one of examples 1 or 2, where downconverting the second signal includes mixing the second signal with a local oscillator (LO) signal; and the method further includes changing an LO frequency of the LO signal over different LO frequencies.

Example 4. The method of claim 3, where determining the interference metric includes determining a measured power corresponding to each of a plurality of frequency ranges; and determining whether the measured power exceeds a threshold.

Example 5. The method of one of examples 3 and 4, further including determining available frequency ranges based on the determined interference metric.

Example 6. The method of example 5, further including, configuring the transmitter to transmit the radar signal over a frequency range of the available frequency ranges.

Example 7. The method of one of examples 3 to 6, where changing the LO frequency includes changing the LO frequency over a plurality of discrete frequencies between a first LO frequency and a second LO frequency.

Example 8. The method of one of examples 3 to 6, where changing the LO frequency includes continuously changing the LO frequency between a first LO frequency and a second LO frequency.

Example 9. The method of one of examples 3 to 6, where changing the LO frequency includes: changing the LO frequency in a first direction in the first time period; and changing the LO frequency in a second direction opposite the first direction during at least a part of the second time period.

Example 10. The method of example 9, where the LO frequency is changed in the second direction during a flyback interval of a PLL used to generate the LO signal.

Example 11. The method of one of examples 1 to 10, further including deactivating the transmitter after a predetermined number of first time periods.

Example 12. The method of one of examples 1 to 11, where the second signal path includes an analog signal path.

Example 13. The method of one of examples 1 to 12, further including bandpass filtering the downconverted second signal.

Example 14. The method of example 13, where bandpass filtering the downconverted second signal includes bandpass filtering the downconverted second signal using a plurality of filters having a plurality of frequency bands; and measuring the power includes measuring the power of the downconverted second signal in each of the plurality of frequency bands.

Example 15. A method including: activating a transmitter to transmit a radar signal during a first time period; receiving a reflection of the radar signal from a radar antenna; downconverting the reflected radar signal to obtain a downconverted analog signal; analog-to-digital converting the downconverted analog signal to form a digitized signal; digitally processing the digitized signal a first signal path; filtering the downconverted analog signal to form a filtered signal; measuring a power of the filtered signal using a second signal path different from the first signal path; and determining an interference metric based on measuring the power.

Example 16. The method of example 15, further including determining whether the measured power exceeds a threshold within a first frequency range.

Example 17. The method of example 16, further including, configuring the transmitter to transmit the radar signal within a second frequency range different from the first frequency range when the measured power exceeds the threshold.

Example 18. The method of one of examples 15 to 17, where filtering the downconverted analog signal includes filtering the downconverted analog signal using a plurality of filters having a corresponding plurality of frequency bands; and measuring the power of the filtered signal includes measuring the power of the filtered signal in each of the plurality of frequency bands.

Example 19. The method of example 18, further including estimating a frequency trajectory of an interference signal based on measuring the power of the filtered signal; and determining when the interference signal will fall within a frequency band used for transmitting the radar signal based on the estimated frequency trajectory.

Example 20. A radar system including: a downconverter having a first input configured to be coupled to a radar antenna and a second input configured to receive a local oscillator (LO) signal; a first receive path coupled to the downconverter, the first receive path configured to digitally process a first signal from the downconverter; a second signal path coupled to the downconverter, where the second signal path is configured to receive a second signal from the downconverter and measure a power of the second signal within a bandwidth, and the second signal path is different from the first receive path; and a controller configured to determine an interference metric based on the power measured by the second signal path.

Example 21. The radar system of example 20, where the second signal path is configured as an analog signal path, and the bandwidth of the second signal path is higher than a signal bandwidth of the first receive path.

Example 22. The radar system of one of examples 20 or 21, where the controller is further configured to determine the interference metric by determining whether the measured power exceeds a threshold.

Example 23. The radar system of one of examples 20 to 22, where the controller is further configured to determine available frequency ranges based on the determined interference metric.

Example 24. The radar system of one of examples 20 to 23, where the controller is configured to configure a transmitter of the radar system to transmit a radar signal over a frequency range of the available frequency ranges.

Example 25. The radar system of example 24, where the controller is configured to: change a frequency of the LO signal in a first direction during a first time interval; change the frequency of the LO signal in a second direction opposite the first direction in a second time interval, where the frequency of the LO signal changes over different LO frequencies during the second time interval; deactivate the transmitter of the radar system during the second time interval; and activate the second signal path during the second time interval.

Example 26. The radar system of one of examples 20 to 25, where the second signal path includes one or more circuits including one or more filters coupled between the downconverter and one or more power detectors.

Example 27. The radar system of example 26, where a passband of the first receive path is within a lower stopband of a first bandpass filter of a first circuit of the one or more circuits; and the passband of the first receive path is within a upper stopband of a second bandpass filter of a second circuit of the one or more circuits.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system comprising:
 a radar transceiver comprising:
  a transmitter,
  a downconverter,
  a first signal path having a first frequency bandwidth coupled to an output of the downconverter, and
  a second signal path different from the first signal path, the second signal path comprising:
   an analog filter having an input coupled to the output of the downconverter, and
   an analog power detector coupled to an output of the analog filter; and
 at least one processor, the at least one processor configured to:
  activate the transmitter of the radar transceiver for transmitting a radar signal during a first time period,
  deactivate the transmitter during a second time period different from the first time period, and
  determine an interference metric based on an output of the analog power detector provided during the second time period.

2. The system of claim 1, wherein the analog filter has a second frequency bandwidth greater than the first frequency bandwidth.

3. The system of claim 1, wherein the first signal path is configured to digitally process the output of the downconverter within the first frequency bandwidth.

4. The system of claim 1, wherein the at least one processor is further configured to estimate a frequency trajectory of an interference signal based on the output of the analog power detector provided during the second time period.

5. The system of claim 4, wherein the at least one processor is further configured to determine when the interference signal will fall within a frequency band used for transmitting the radar signal based on the estimated frequency trajectory.

6. The system of claim 1, further comprising an oscillator configured to provide a local oscillator (LO) signal to the downconverter, wherein the at least one processor is configured to change an LO frequency of the LO signal over different LO frequencies, wherein changing the LO frequency comprises changing the LO frequency in a first direction in the first time period, and changing the LO frequency in a second direction opposite the first direction during at least a part of the second time period.

7. The system of claim 1, wherein the analog filter comprises a bandpass filter.

8. The system of claim 7, wherein the analog filter comprises a plurality of analog filters having a plurality of corresponding frequency bands.

9. A method of operating a radar transceiver comprising a transmitter, a downconverter, a first signal path having a first frequency bandwidth coupled to an output of the downconverter, and a second signal path different from the first signal path, the second signal path comprising an analog filter having an input coupled to the output of the downconverter, and an analog power detector coupled to an output of the analog filter, the method comprising:
  activating the transmitter for transmitting a radar signal during a first time period;
  deactivating the transmitter during a second time period different from the first time period; and
  determining an interference metric based on an output of the analog power detector provided during the second time period.

10. The method of claim 9, wherein the steps of activating, deactivating and determining are performed using at least one processor.

11. The method of claim 9, further comprising estimating a frequency trajectory of an interference signal based on the output of the analog power detector provided during the second time period.

12. The method of claim 11, further comprising determining when the interference signal will fall within a frequency band used for transmitting the radar signal based on the estimated frequency trajectory.

13. The method of claim 9, further comprising:
  providing, by an oscillator, a local oscillator (LO) signal to the downconverter; and
  changing a LO frequency of the LO signal in a first direction in the first time period, and changing the LO frequency in a second direction opposite the first direction during at least a part of the second time period.

14. A system comprising:
  a first signal path having a first frequency bandwidth configured to be coupled to an output of a radar transceiver;
  a second signal path different from the first signal path, the second signal path comprising:
    an analog filter having an input configured to be coupled to the output of the radar transceiver, and
    an analog power detector coupled to an output of the analog filter; and
  at least one processor, the at least one processor configured to:
    activate a transmitter of the radar transceiver for transmitting a radar signal during a first time period,
    deactivate the transmitter during a second time period different from the first time period, and
    determine an interference metric based on an output of the analog power detector provided during the second time period.

15. The system of claim 14, further comprising the radar transceiver.

16. The system of claim 14, wherein in the at least one processor is configured to change a transmit frequency of the radar transceiver in a first direction in the first time period, and change the transmit frequency of the radar transceiver in a second direction opposite the first direction during at least a part of the second time period.

17. The system of claim 14, wherein the at least one processor is further configured to:
  estimate a frequency trajectory of an interference signal based on the output of the analog power detector provided during the second time period; and
  determine when the interference signal will fall within a frequency band used for transmitting the radar signal based on the estimated frequency trajectory.

18. The system of claim 14, wherein the analog filter comprises a plurality of bandpass filters having a plurality of corresponding frequency bands.

19. The system of claim 18, wherein the analog power detector comprises a plurality analog power detectors correspondingly coupled to outputs of the plurality of bandpass filters.

20. The system of claim 14, wherein the second signal path comprises a second frequency bandwidth, and wherein the second frequency bandwidth is higher than the first frequency bandwidth.

* * * * *